United States Patent Office 2,869,891
Patented Jan. 20, 1959

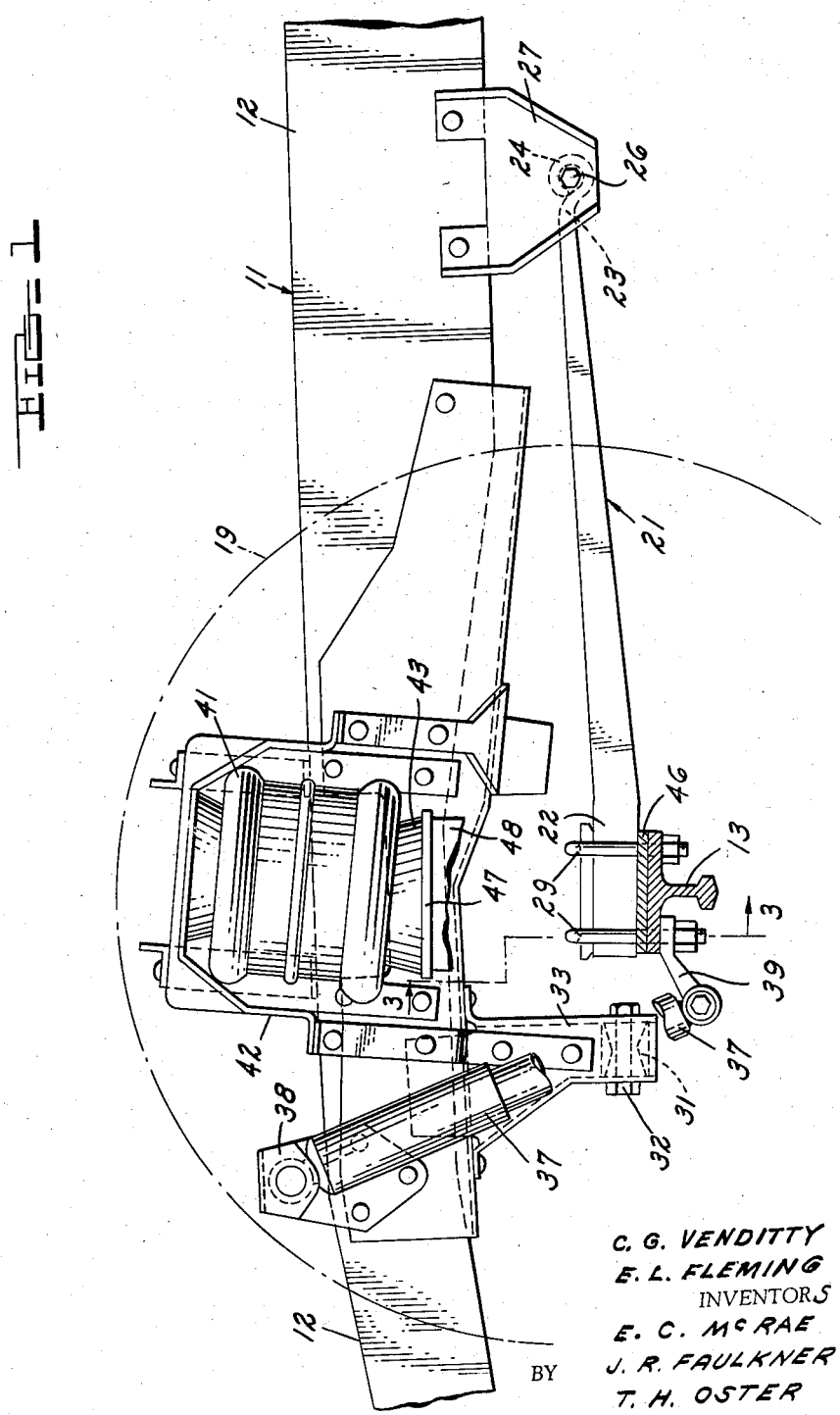

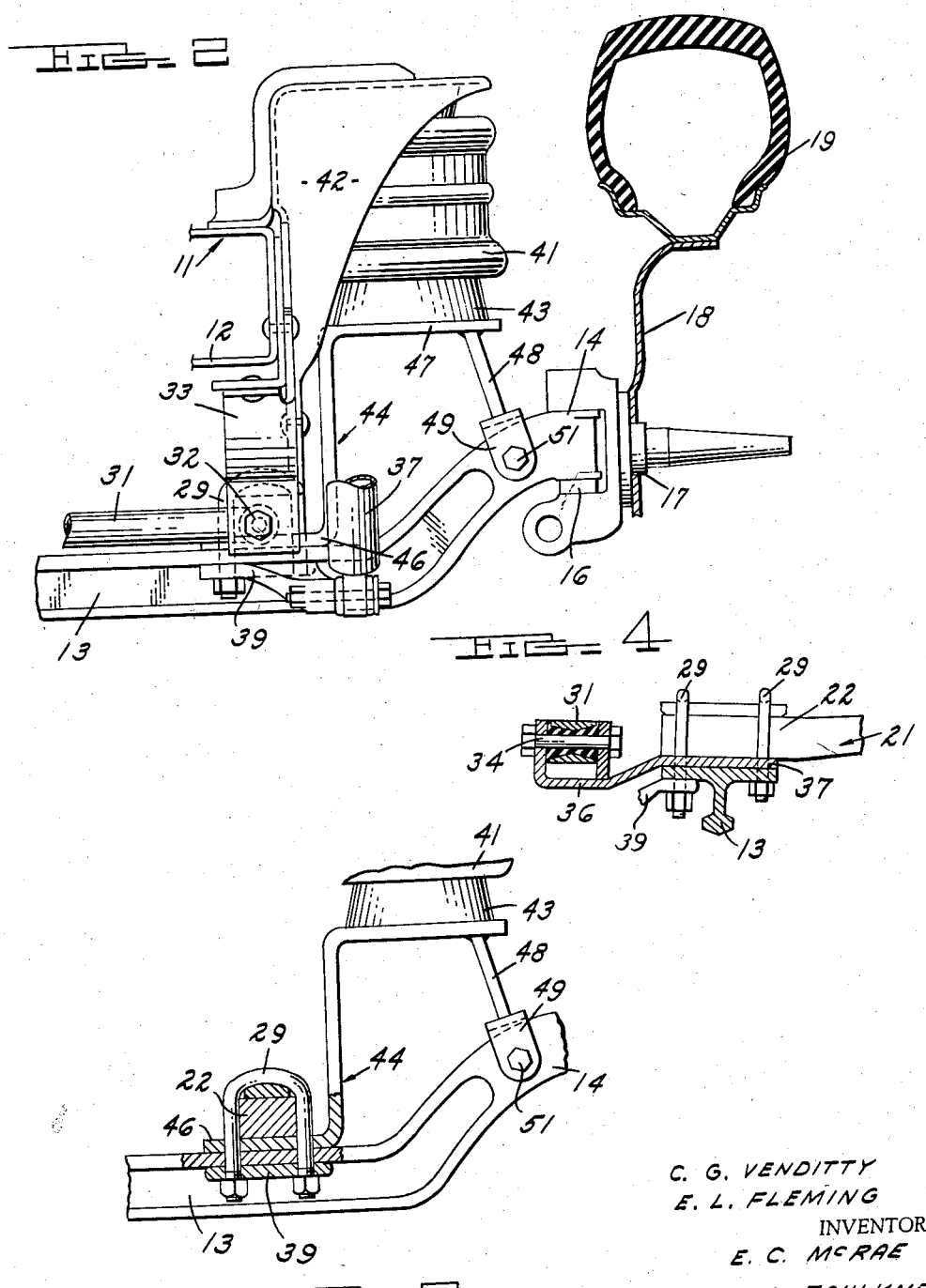

2,869,891

ROLL RESISTING MOTOR VEHICLE WHEEL SUSPENSION

Chester G. Venditty, Dearborn, and Earl L. Fleming, Farmington, Mich., assignors to Ford Motor Company, Dearborn, Mich., a corporation of Delaware Application November 19, 1956, Serial No. 622,972

1 Claim. (Cl. 280—124)

This invention relates generally to motor vehicles, and has particular reference to motor vehicle wheel suspensions.

An object of the present invention is to provide a motor vehicle wheel suspension utilizing a rigid transversely extending axle connected to the side frame rails by longitudinally extending spring members having their forward ends rigidly connected to the axle and their rearward ends pivotally connected to the side frame rails for pivotal movement about a transverse horizontal axis. The spring members may be in the form of single roll tapered cantilever springs, laminated cantilever springs, or other spring formations such as bar or tubular members having torsional as well as bending properties. A track bar is provided between the axle and the frame for transverse stability, and primary spring means are provided between the axle and the frame for supporting the vehicle weight and controlling jounce and rebound movements. An advantage of the present construction resides in the fact that the longitudinally extending spring members absorb the braking torque and provide roll resistance without affecting the ride rate of the primary load supporting springs during jounce and rebound movement. During jounce and rebound with equal wheel movements the spring members act as pivoted arms only and provide no spring action either in bending or in torsion, and consequently do not change the ride rate of the primary springs, thus resulting in the most favorable ride characteristics. In roll, however, or when uneven road conditions result in unequal wheel movement, the longitudinally extending spring members act in torsion and in bending to provide roll resistance and afford lateral stability to the vehicle.

Other objects and advantages of this invention will be made more apparent as this description proceeds, particularly when considered in connection with the accompanying drawings, wherein:

Figure 1 is a side elevational view, partly broken away and in section, of a motor vehicle wheel suspension incorporating the present invention.

Figure 2 is a fragmentary front elevational view of the construction shown in Figure 1.

Figure 3 is a fragmentary view, partly in section, of a portion of the construction shown in Figure 2.

Figure 4 is a fragmentary side elevational view, partly in section, illustrating the connection of the track bar to the axle.

Although the drawings illustrate only one side of the chassis and the vehicle suspension system, it will be understood that the chassis and suspension system are symmetrical about the longitudinal center line of the vehicle.

Referring now to the drawings, the reference character 11 indicates generally a motor vehicle frame having a pair of box section longitudinally extending side frame rails 12. Extending transversely beneath the frame 11 is a rigid front axle 13 of I beam cross section. At each outer end the axle is bent upwardly to form a steering knuckle 14 pivotally connected by a king pin 16 to a wheel spindle 17, the latter rotatably supporting a road wheel 18 carrying a tire 19.

The axle 13 is connected to the frame 11 by means of a pair of laterally spaced longitudinally extending spring members 21. In the present instance each spring member 21 is shown as a single unitary leaf spring which is roll tapered from a maximum thickness at its forward end 22 to a minimum thickness at its rearward end 23, the latter terminating in an eye 24 pivotally connected by a pivot pin 26 to a hanger 27 depending from the side frame rail 12 and suitably secured thereto. At its forward end each spring member 21 is rigidly connected to the axle 13 by U-bolts 29.

A transversely extending track bar 31 is employed to provide lateral stability and support to the suspension. The track bar 31 is pivotally connected at one end by means of a pivot pin 32 to a bracket 33 secured to and depending from the forward portion of the side frame rail 12 at one side of the vehicle. This construction is shown in Figures 1 and 2. At the opposite side of the vehicle, as shown in Figure 4, the track bar 31 is pivotally connected by means of a pivot pin 34 to a bracket 36 having an integral mounting flange 37 clamped between the forward end 22 of the spring member 21 and the axle 13.

A tubular direct acting shock absorber 37 is provided at each end of the axle 13. Each shock absorber 37 is pivotally connected at its upper end to a bracket 38 secured to the side frame rail 12 and is pivotally connected at its lower end to a bracket 39 secured to the axle 13 by one of the U-bolts 29. With its opposite ends thus connected to the axle and to the frame respectively, the track bar 31 controls the lateral position of the axle during jounce and rebound and provides lateral stability and support.

Although any desired type of primary springs may be used in connection with the present suspension, the drawings illustrate an air suspension utilizing a rubber air spring 41 at each side of the vehicle. The air spring 41 is connected at its upper end to a supporting bracket 42 secured to the side frame rail 12 and at its lower end is seated upon a sheet metal support 43 supported upon a Z-shaped frame bracket 44 having its lower leg 46 clamped between the spring member 21 and the axle 13. The outboard end of the upper flange 47 of the Z-shaped bracket 44 is supported upon the outer end of the axle 13 by means of strut 48 having a clevis 49 at its lower end connected to the axle by the bolt 51.

When the front axle 13 moves in jounce of rebound, with each of the front wheels having equal movement, the spring members 21 are not placed in torsion or in bending but operate only as suspension arms guiding the path of movement of the axle. Under these conditions the air springs 41 support the entire load and they alone determine the ride rate since the spring members 21 do not under these circumstances contribute to or affect the ride rate.

When the vehicle is placed in roll, as during cornering, or when road conditions result in unequal jounce or rebound movement of the two front wheels, the spring members 21 are placed under stress. Under these conditions the front axle is inclined with respect to the frame in a lateral direction, and the spring members 21 are subjected to torsion as well as bending stresses. The spring members thus offer resistance to roll and stabilize the vehicle under such conditions. The members 21 also absorb the braking torque in addition to guiding the front axle and providing roll resistance.

It will thus be seen that the spring members 21 in combination with the primary springs 41, the track bar 31 and the shock absorbers 37 provide an efficient suspension having desirable operating and ride characteristics. This suspension is shown in connection with a front axle for a commercial vehicle but could be also used in connection with a rear axle and with a passenger vehicle. Likewise, any suitable primary spring means could be used in place of the air springs 41. The spring member 21 is shown in the form of a single integral roll tapered leaf spring of the cantilever type. This type of spring is economical to manufacture and provides the desired characteristics under torsion and bending stresses. The spring could, however, be a laminated spring, or could take other forms such as a bar or tube having the desired torsion and bending stress characteristics.

It will be understood that the invention is not to be limited to the exact construction shown and described, but that various changes and modifications may be made without departing from the spirit and scope of the invention, as defined in the appended claim.

What is claimed is:

In a wheel suspension for a motor vehicle, a frame having a longitudinally extending side frame rail, a rigid front axle having a lower intermediate portion extending transversely beneath said side frame rail and an upwardly offset outboard end portion, a front road wheel rotatably mounted upon the upwardly offset outboard end portion of the axle, a longitudinally extending steel spring located directly beneath said side frame rail, means pivotally supporting the rearward end of said spring directly beneath said side frame rail, the forward end of said spring terminating adjacent said rigid axle and overlying the lower intermediate portion of said axle, an inverted U-shaped supporting bracket positioned vertically above the outboard end portion of said axle between the vertical plane of said side frame rail and said road wheel, the outboard leg of said supporting bracket being secured to the upwardly offset outboard end portion of said axle adjacent said road wheel and the inboard leg of said supporting bracket having an inwardly extending flange at its lower end positioned between said rigid axle and the forward end of said spring, means clamping said last mentioned flange of the supporting bracket and said spring and axle together, a second bracket extending upwardly and outwardly from said side frame rail and projecting over said supporting bracket, a compression spring supported between said supporting bracket and said second bracket adjacent the outboard side of said side frame rail to resiliently support said vehicle while said longitudinally extending steel spring provides secondary spring means operating under roll conditions.

References Cited in the file of this patent

UNITED STATES PATENTS

| | | |
|---|---|---|
| 1,797,146 | Hull | Mar. 17, 1931 |
| 2,179,016 | Leighton | Nov. 7, 1939 |
| 2,608,752 | Schilling | Sept. 2, 1952 |
| 2,693,354 | Walter | Nov. 2, 1954 |
| 2,777,686 | Giacosa | Jan. 15, 1957 |